US 9,456,199 B2

(12) United States Patent
Ohsumi et al.

(10) Patent No.: US 9,456,199 B2
(45) Date of Patent: Sep. 27, 2016

(54) STEREO CAMERA

(71) Applicant: Hitachi, Ltd., Chiyoda-ku, Tokyo (JP)

(72) Inventors: Ken Ohsumi, Tokyo (JP); Masaaki Fukuhara, Mito (JP); Tatsuhiko Monji, Hitachinaka (JP); Norio Koike, Hitachiomiya (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/161,360

(22) Filed: Jan. 22, 2014

(65) Prior Publication Data

US 2014/0132739 A1    May 15, 2014

Related U.S. Application Data

(63) Continuation of application No. 11/666,340, filed as application No. PCT/JP2005/021194 on Nov. 14, 2005, now abandoned.

(30) Foreign Application Priority Data

Nov. 15, 2004    (JP) ................. 2004-329940

(51) Int. Cl.
   *H04N 13/02*      (2006.01)
   *B60R 11/04*      (2006.01)
   *G01S 11/12*      (2006.01)
   *G03B 35/08*      (2006.01)
   *H04N 5/225*      (2006.01)
   *G03B 11/04*      (2006.01)
   *B60R 11/00*      (2006.01)

(52) U.S. Cl.
   CPC ........... *H04N 13/0239* (2013.01); *B60R 11/04* (2013.01); *G01S 11/12* (2013.01); *G03B 11/045* (2013.01); *G03B 35/08* (2013.01); *H04N 5/2253* (2013.01); *B60R 2011/0003* (2013.01)

(58) Field of Classification Search
   None
   See application file for complete search history.

(56) References Cited

U.S. PATENT DOCUMENTS

| 4,669,843 A | 6/1987 | Bozzolato |
| 4,879,596 A | 11/1989 | Miura et al. |
| 5,233,382 A | 8/1993 | Taniguchi et al. |

(Continued)

FOREIGN PATENT DOCUMENTS

| CA | 2 224 186 A1 | 6/1998 |
| DE | 197 36 815 A1 | 6/1999 |

(Continued)

OTHER PUBLICATIONS

Japanese Office Action with partial English translation dated Feb. 12, 2013 (four (4) pages).

*Primary Examiner* — Tracy Li
*Assistant Examiner* — Mohammad J Rahman
(74) *Attorney, Agent, or Firm* — Crowell & Moring LLP

(57) ABSTRACT

Although a conventional method can eliminate a mounting position deviation when left and right camera units only are taken into consideration, a problem is posed that deviation again occurs due to poor machining precision and assembly precision at the mounting surface between a camera unit and a member when a camera unit is mounted to a stay. According to this invention, mounting surfaces for mounting left and right imaging elements to a stay are provided to directly position left and right imaging elements to the stay, whereby built-up tolerance between components is reduced and the positional mounting precision between imaging elements is improved.

6 Claims, 17 Drawing Sheets

(56) References Cited

U.S. PATENT DOCUMENTS

| | | | | |
|---|---|---|---|---|
| 5,671,450 | A | * | 9/1997 | Suzuki ................ G03B 35/10 348/E13.007 |
| 5,748,448 | A | * | 5/1998 | Hokari .................... 361/749 |
| 5,778,268 | A | | 7/1998 | Inaba |
| 6,190,309 | B1 | * | 2/2001 | Ooshima ............ A61B 1/00142 600/118 |
| 6,296,360 | B1 | * | 10/2001 | Inaba .................... G03B 21/64 353/120 |
| 6,404,484 | B1 | * | 6/2002 | Sogawa .................... 356/3.14 |
| 6,785,403 | B1 | * | 8/2004 | Murakami et al. .......... 382/104 |
| 7,106,365 | B1 | | 9/2006 | Sogawa |
| 7,111,996 | B2 | | 9/2006 | Seger et al. |
| 7,248,287 | B1 | * | 7/2007 | Sogawa et al. .......... 348/208.99 |
| 2002/0003571 | A1 | * | 1/2002 | Schofield ............ B60C 23/00 348/148 |
| 2002/0145676 | A1 | * | 10/2002 | Kuno et al. .................... 348/340 |
| 2004/0043649 | A1 | | 3/2004 | O'Connell et al. |
| 2004/0188642 | A1 | * | 9/2004 | Kodama et al. .......... 250/559.29 |
| 2004/0208497 | A1 | | 10/2004 | Seger et al. |
| 2004/0232312 | A1 | | 11/2004 | Belau |
| 2005/0046584 | A1 | * | 3/2005 | Breed .................... B60C 11/24 340/13.31 |
| 2005/0115095 | A1 | | 6/2005 | Kurfiss et al. |
| 2005/0116120 | A1 | * | 6/2005 | Maruyama .................... 248/49 |
| 2006/0005371 | A1 | * | 1/2006 | Sano et al. ................ 29/468 |
| 2006/0018513 | A1 | * | 1/2006 | Sogawa ........................ 382/106 |
| 2006/0145105 | A1 | * | 7/2006 | Ishida et al. .................... 251/7 |
| 2009/0135246 | A1 | * | 5/2009 | Uchiyama ................ G01C 3/18 348/42 |
| 2010/0302370 | A1 | * | 12/2010 | Sogawa et al. ............... 348/148 |

FOREIGN PATENT DOCUMENTS

| | | |
|---|---|---|
| DE | 202 09 101 U1 | 3/2003 |
| EP | 1 087 27 A2 | 3/2001 |
| JP | 7-72560 A | 3/1995 |
| JP | 8-113082 A | 5/1996 |
| JP | 11-259633 A | 9/1999 |
| JP | 11 281351 A | 10/1999 |
| JP | 11-301365 A | 11/1999 |
| JP | 2001-88611 A | 4/2001 |
| JP | 2001-92048 A | 4/2001 |
| JP | 2001-242521 A | 9/2001 |
| JP | 2001-305681 A | 11/2001 |
| JP | 2002-369060 A | 12/2002 |
| JP | 2003-84357 A | 3/2003 |
| JP | 2003-304561 A | 10/2003 |
| JP | 2003-312376 A | 11/2003 |
| JP | 2003-335180 A | 11/2003 |
| JP | 2005-22496 A | 1/2005 |
| JP | 2006-33282 A | 2/2006 |
| WO | WO 03/005455 A1 | 1/2003 |

* cited by examiner (a)

(b)

(a)

(b)

(c)

(d)

(a)

(b)

(a)

(b)

(c)

(a)

(b)

(a)

(b)

(c)

(d)

(a)

(b)

(c)

(a)

(b)

(a)

(b)

GROUND SURFACE

STEREO CAMERA

CROSS-REFERENCE TO RELATED APPLICATIONS

This application is a continuation of U.S. patent application Ser. No. 11/666,340, which is the U.S. National Stage of PCT/JP2005/021194, filed on Nov. 14, 2005, the entire disclosure of which is expressly incorporated herein by reference, which in turn claims priority under 35 U.S.C §119 to Japanese Patent Application No. 2004-329940, filed on Nov. 15, 2004, the priority of which is also claimed here.

TECHNICAL FIELD

The present invention relates to a stereo camera, on which a plurality of imaging elements is mounted.

BACKGROUND ART

A stereo camera, in which a pair of pictures photographed by the use of two imaging means is used for calculating a distance to an object to thereby recognize the object, begins to be applied to a car-mounted system for supporting a safe traveling of a vehicle and a monitor system for detecting entrance of a suspicious person and abnormality.

In a stereo picture processing used in such systems, a triangulation technique is applied to a pair of photographed pictures spaced in position and photographed to find a distance, and a device for realization of such application generally comprises a pair of imaging means and a stereo picture processing LSI, which performs a triangulation picture processing on a pair of photographed pictures output from the imaging means. At this time, the stereo picture processing LSI performs processing to find pixel positions of a featuring point common to the mutual pictures and the number of pixels, in which the featuring points do not agree with each other in the pair of pictures among pixel information contained in the pair of pictures, thus realizing the triangulation processing. Therefore, it is ideal unless disagreement except parallax is present between the pair of pictures and it is necessary to perform regulation every imaging means so that disagreements in optical characteristic and signal characteristic are not generated. In particular, in a car-mounted situation, there is a demand for application, such as detection of a vehicle going ahead, a person, an obstacle, etc. to cope beforehand with safety, and therefore, it is necessary to surely realize distance estimation and recognition of a far distant object.

Structures, which maintain the relative, positional relationship between a pair of imaging elements in a stereo camera over a long term, are described in JP-A-11-301365 or JP-A-2003-335180.

However, the prior arts described above are one, in which a positional relationship is preserved after being mounted on the assumption that a pair of imaging elements are mounted in an exact, relative, positional relationship, and any marked contrivance is not made at the time of manufacture of a stereo camera as to how exactly left and right imaging elements are mounted in the relative relationship. Also, according to the prior arts, the positional relationship of lenses and imaging elements is first maintained in respective left and right camera parts and after regulation is made and fixation is effected so that any disagreement of the imaging elements in a direction of rotation is eliminated relative to a certain surface of a member, to which lenses and imaging elements are mounted, the camera parts are mounted to a member, which serves as a reference. However, the use of such method eliminates disagreement relative to the certain surface in the camera parts in the direction of rotation but disagreement is again generated due to machining accuracy of a mounted surface of the camera parts and a member, which serves as a reference and assembly accuracy when the camera parts are mounted to the member. Therefore, there is generated a need of decreasing such disagreement through an improvement in machining accuracy of a mount surface and assembly accuracy, so that stereo cameras involve problem of worsening in productivity and increase in cost.

DISCLOSURE OF THE INVENTION

The invention is characterized in that imaging element mount surfaces, to which left and right imaging elements are mounted, are provided on a stay and the left and right imaging elements are directly positioned on the stay to constitute a stereo camera. Thereby, accumulation of tolerances among parts is decreased and the positional relationship between imaging elements is improved in mount accuracy.

BEST MODE FOR CARRYING OUT THE INVENTION

Figure 16:
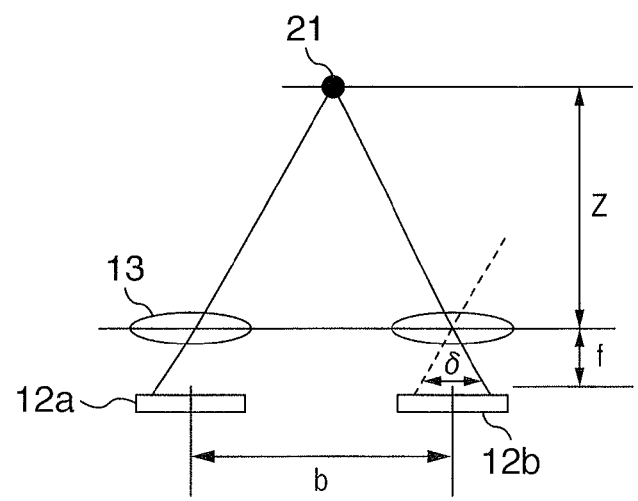
FIG. 16 is a schematic view illustrating the principle of a stereo camera.

First, importance in the relative, positional relationship between left and right imaging elements in a stereo camera will be described. Generally, it is demanded in a stereo camera device that as an object is positioned distant, any disagreement except the parallax described above be absent. The principle of a stereo camera device is shown in FIG. 16(a). Here, δ denotes parallax, Z a measurement distance, f a focal distance, and b a base line length, among which the relationship shown by the following formula is established.

$$Z = b \cdot f / \delta \quad \text{(formula 1)}$$

Figure 17:
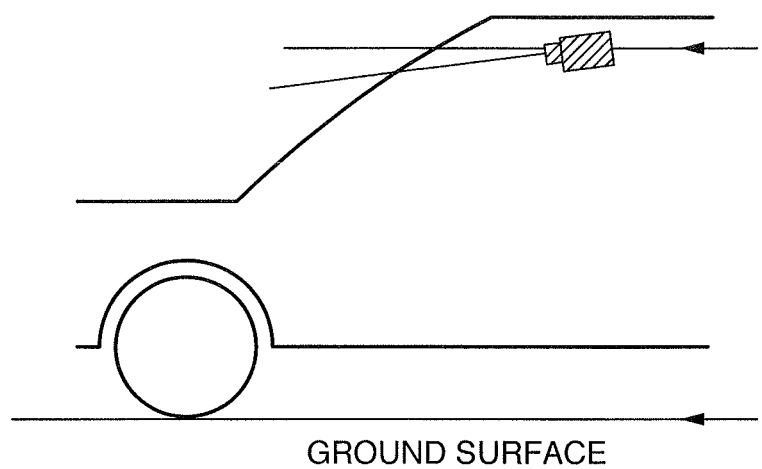
FIG. 17 is a schematic view of a general mount position of a stereo camera when mounted to a vehicle.
Figure 19:
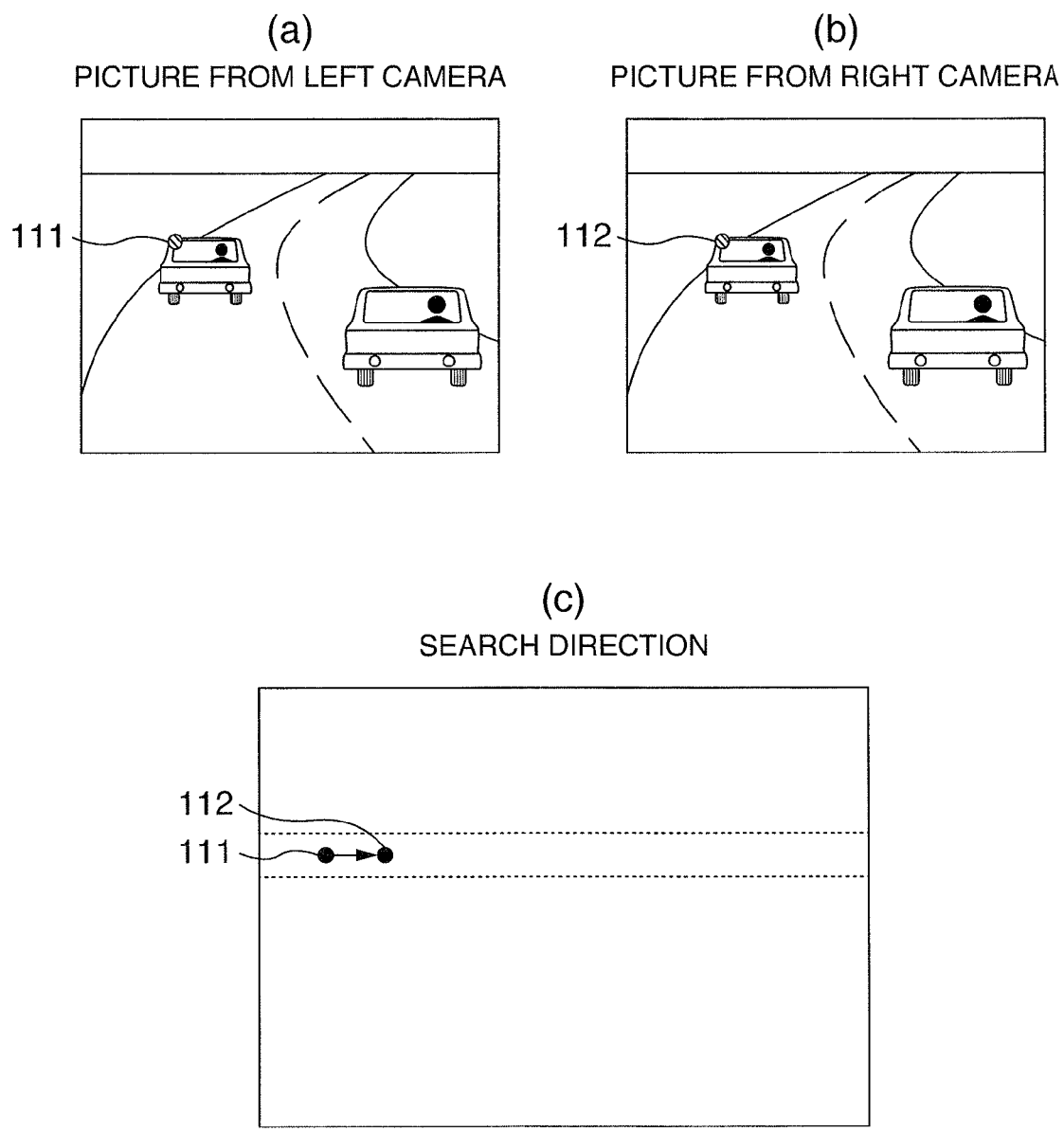
FIG. 19 is image views illustrating pictures acquired by left and right cameras in a state, in which left and right imaging elements are put in an ideal mounted state.

When a pair of imaging means are mounted in the vicinity of a room mirror in a compartment in an orientation, in which photographing is effected in a vehicle traveling direction, as shown in FIG. 17 with a view to use in, for example, a car-mounted environment, pictures photographed by two imaging means disposed distant the base line length b from each other gives ones, which are obtained by photographing the same object at somewhat different angles as shown in FIGS. 19(a) and 19(b). Disagreement between the two pictures makes parallax δ. When, for example, an end of a vehicle body as photographed is made a featuring point as shown in FIG. 19 and it is tried to search the same featuring point from the other of the pictures, a level of which the one is also photographed in the same pixel position on a screen as shown in FIG. 19 in an ideal state, in which no positional disagreement occurs when imaging elements are mounted, and the object is photographed with disagreement corresponding to the parallax. Therefore, a slight disagreement in the featuring point is converted into a distance, and a magnitude and a distance up to a three-dimensional object are calculated as shown in FIG. 19(c).

Figure 20:
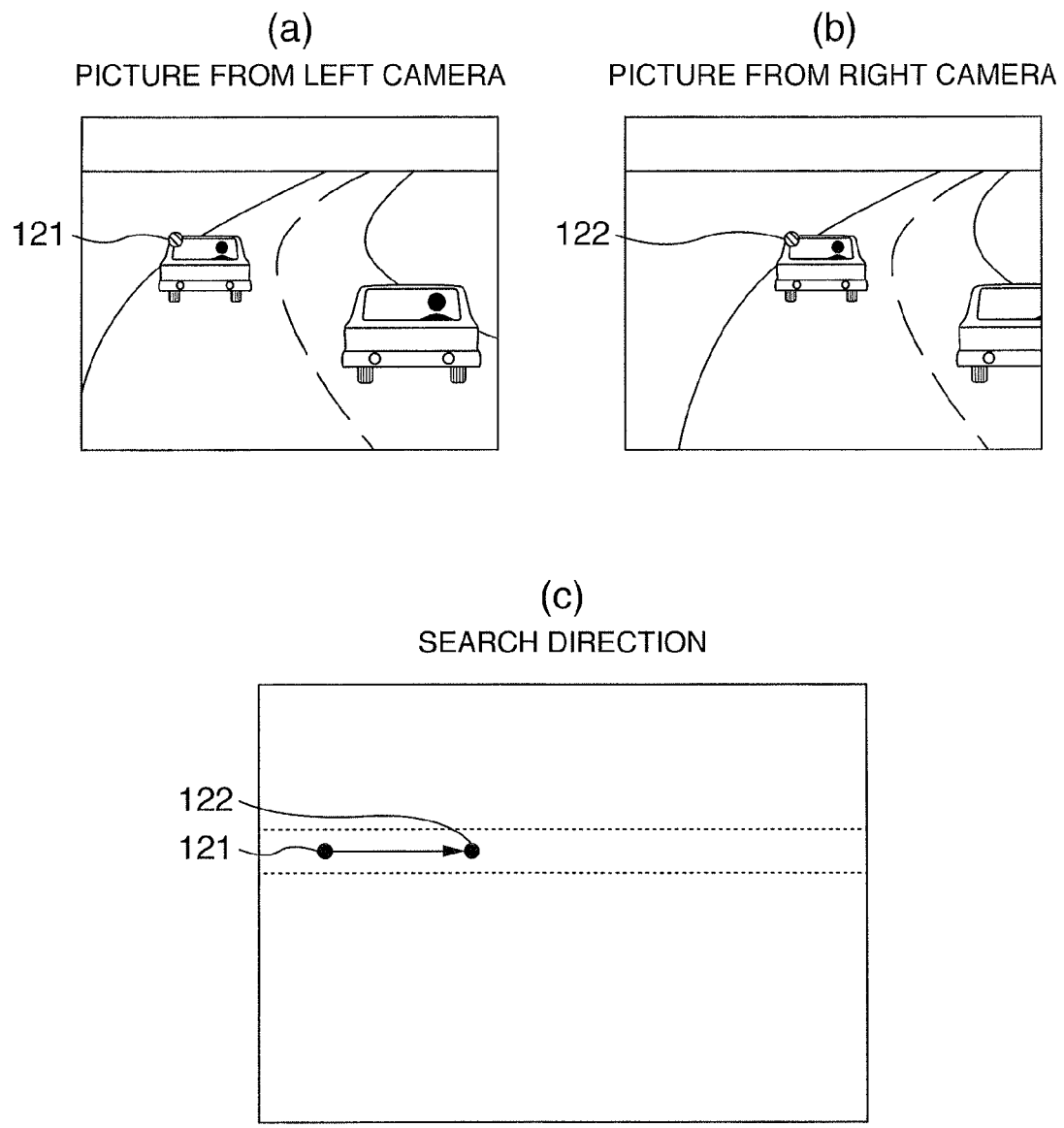
FIG. 20 is image views illustrating pictures acquired by left and right cameras in a state, in which mounted positions of left and right imaging elements are deviated in a left and right direction.

Here, when the imaging elements are mounted deviating in, for example, a left and right direction, the featuring point is photographed, as shown in FIG. 20, in a different position in a horizontal direction from a pixel position, in which it should appear originally. Then, the parallax becomes larger than an original one as shown in FIG. 20(c) and erroneous recognition occurs as there is a large three-dimensional object.

Figure 21:
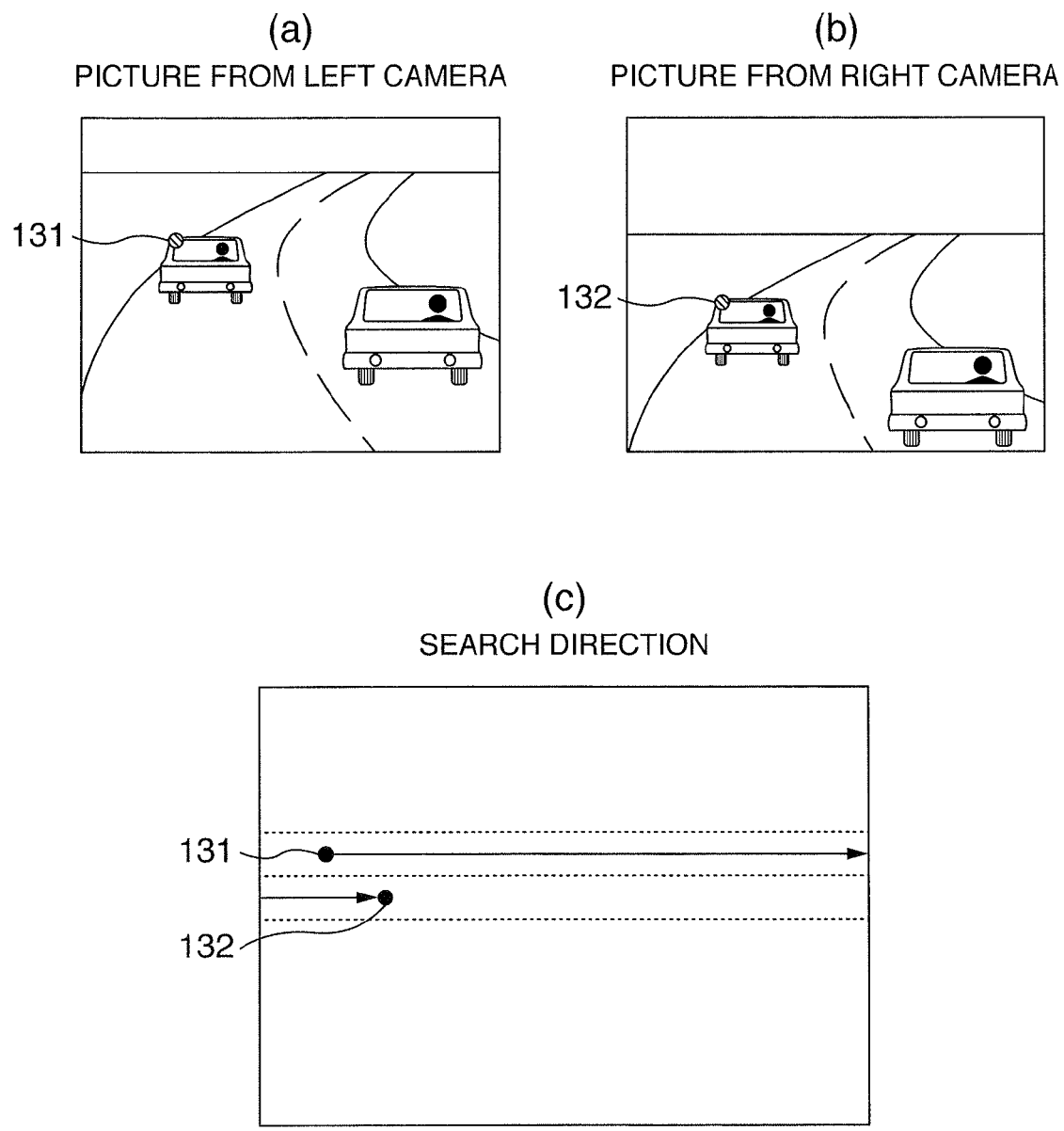
FIG. 21 is image views illustrating pictures acquired by left and right cameras in a state, in which mounted positions of left and right imaging elements are deviated in a vertical direction.
Figure 22:
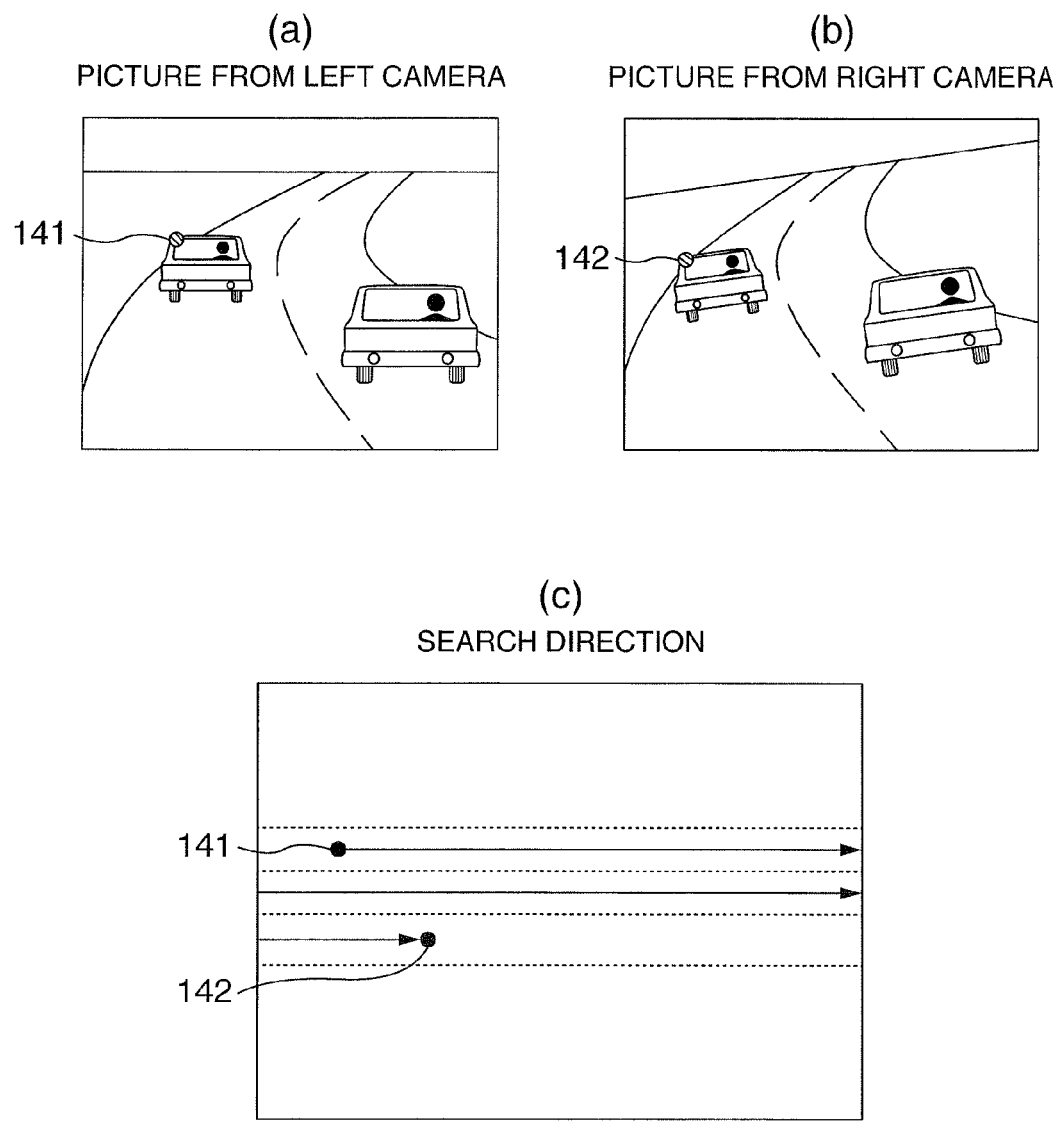
FIG. 22 is image views illustrating pictures acquired by left and right cameras in a state, in which mounted positions of left and right imaging elements are deviated in a direction of rotation relative to an axis perpendicular to that plane, in which the imaging elements are mounted.

Also, when disagreement occurs in a vertical direction and in a direction of rotation, disagreement in the vertical direction is also photographed as shown in FIGS. 21 and 22. Then, although it should originally suffice to search corresponding to one line, it becomes necessary to search corresponding to several lines, so that an increase in turnaround time and memory capacity results.

Here, the formula 1 is made use of to simply show what extent of degradation in distance measurement accuracy is generated when disagreement of, for example, a single pixel occurs in the horizontal direction in the case where the positional relationship between the imaging elements is deviated when, for example, 100 m is assumed in demanding a distance measurement (Z=100 m: distance measurement of an object 100 m disposed ahead). First, let assume from the constitutional condition of general stereo camera devices that as parameter values except Z being substituted for the formula 1, f=10 mm, b=350 mm, and imaging elements as used are CCD (Charge Coupled Device) image sensors having ¼ inch and 380,000 pixels. When these parameter values are substituted for the formula 1, degradation of about 20 m in distance measurement accuracy can be generated assuming that disagreement of one pixel in the horizontal direction is generated in distance measurement of an object 21 disposed 100 m ahead. This is not an allowable range of accuracy demanded for distance measurement of 100 m, so that it is requested that the positional relationship between the imaging elements 12a and 12b be high in accuracy.

As described above, the positional relationship between the imaging elements 12a and 12b is important in performing a stereo processing in high efficiency with high accuracy. Subsequently, the construction of a stereo camera device of the invention will be described, which is simple and inexpensive and by which the relative, positional relationship between the imaging elements 12a and 12b can be improved in mount accuracy.

Figure 1:
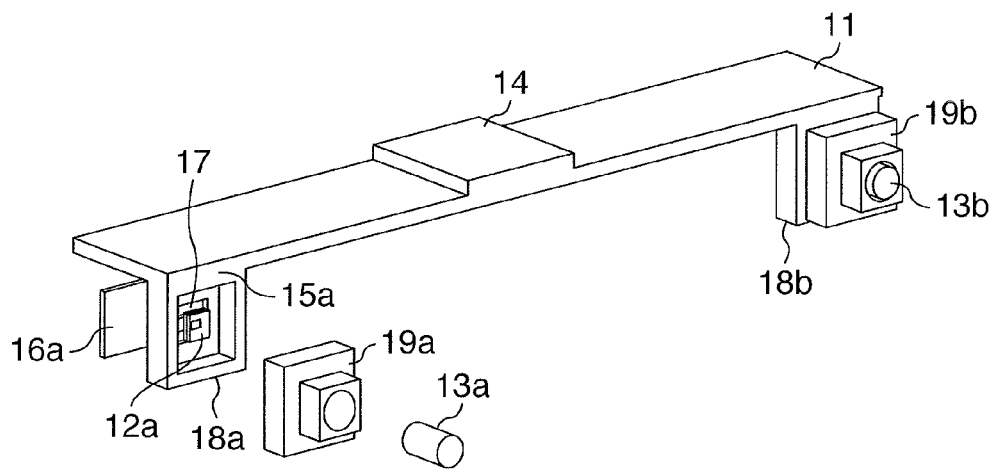
FIG. 1 is schematic views of a stereo camera in an embodiment of the invention.
Figure 1:
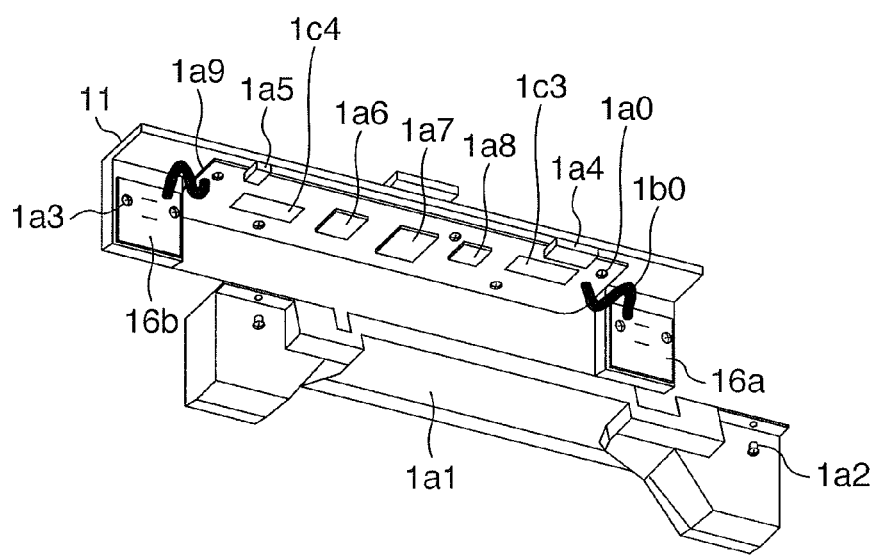

A first embodiment of the invention will be described with reference to the drawings. FIG. 1 shows an example of the construction of a stereo camera according to the invention. FIG. 1(a) is a bird's-eye view as viewed from the front and FIG. 1(b) is a bird's-eye view as viewed from the rear.

As shown in FIG. 1(a), the stereo camera according to the embodiment comprises two imaging elements 12a, 12b (not shown), a stay 11 with which stay projections 18a, 18b on which the two imaging elements are mounted elements are made integral, two lenses 13a, 13b, lens holders 19a, 19b that hold the positional relationship between the lenses and the imaging elements, imaging element substrates 16a, 16b performing that processing, in which picture information formed on the imaging elements 12a, 12b is taken into a picture processing LSI, and a processing substrate 1a9 on which the picture processing LSI that uses a taken picture to perform a stereo processing is mounted.

The lenses 13a, 13b are components to form visual information of the outside on the imaging elements 12a, 12b.

The stay 11 is a member to fix a stay reference surface 14 to a stay on the side of a vehicle to hold the imaging elements 12, the imaging element substrates 16, and the processing substrate 1a9. The imaging elements 12a, 12b are directly mounted from forward of the stay projections 18a, 18b of the stay 11 and the imaging element substrates 16a, 16b are mounted from rearward of the stay projections 18a, 18b. At this time, imaging element terminal holes 17 are provided on the stay projections 18a, 18b so that terminals of the imaging elements 12a, 12b can be joined to the imaging element substrates 16a, 16b.

Here, imaging element mount surfaces 44a, 44b are provided on the stay projections 18a, 18b to serve as reference surfaces to mount the imaging elements 12a, 12b, and the imaging elements 12a, 12b can be mounted on predetermined flat planes by mounting the imaging elements 12a, 12b in agreement with the imaging element mount surfaces 44a, 44b. In addition, the stereo camera is preferably constructed such that the imaging elements 12a, 12b are arranged on substantially the same plane or parallel planes. Also, the stay projections 18a, 18b are provided with reference surfaces 41, which serve as references for mount angles of the imaging elements 12a, 12b, and disagreement of imaging angles of the imaging elements 12a, 12b can be made substantially negligible in value by mounting the imaging elements 12a, 12b in agreement with the reference surfaces 41. With such construction, one of joint locations, in which tolerance is involved, can be reduced as compared with that prior art, in which two cameras are assembled separately and then mounted to a stay, so that the stereo camera can be improved in measurement accuracy with a simple construction. That is, while the prior art involves the existence of two tolerances of [imaging element-camera body] and [camera body-stay], the construction of the embodiment can be limited to only tolerance of [camera body-stay]. In addition, the structure of the stay projections 18a, 18b will be described later in detail.

Also, since the imaging elements 12 are soldered to the imaging element substrates 16, holes 43 are formed on the imaging element substrates 16 as shown in FIG. 3(d) so that terminals 32 of the imaging elements 12 can be inserted into the imaging element substrates 16.

The imaging element substrates 16 are ones, which are joined to the imaging elements 12 and on which a circuit is provided to transmit picture information taken by the imaging elements 12 to the processing substrate 1a9. In addition, the left and right imaging element substrates 16a, 16b perform processing, in which picture information formed on the imaging elements 12a, 12b is taken into a picture processing LSI 1a7 provided on the processing substrate 1a9.

The processing substrate 1a9 is one formed with a circuit, which uses the picture processing LSI to extract an object on the basis of picture information fed from 16a, 16b to calculate a distance to and a magnitude of the object.

An interior of the stereo camera will be described with reference to FIG. 1(b). The processing substrate 1a9 is fixed to the stay 11 by means of a plurality of screws 1b1 and the imaging element substrates 16 on the both left and right ends are fixed to the stay 11 by means of a plurality of screws 1a3. The left and right imaging element substrates 16a, 16b and the processing substrate 1a9 are connected to each other by harnesses 1b0. The processing substrate 1a9 is provided with a picture processing LSI 1a7, which uses a picture as taken to perform a stereo processing to calculate a distance to and a magnitude of an object, an arithmetic processing unit 1a6, which performs various applications (for example, vehicle detection, pedestrian detection, etc.) using the picture having been subjected to stereo processing, and an interface microcomputer 1a8, which gives and takes information from outside the camera. Here, the interface microcomputer 1a8 in the embodiment also functions to monitor the arithmetic processing unit 1a6.

A power supply connector 1a4, which supplies from outside electric power to respective microcomputers and IC of the stereo camera such as the arithmetic processing unit 1a6, the picture processing LSI, the interface microcomputer 1a8, etc., and a projected image connector 1a5, through which pictures having been subjected to stereo processing are output to an outside are connected to the processing substrate 1a9.

Also, a cover 1a1 to protect the processing substrate 1a9 and the imaging element substrates 16a, 16b is mounted to a back side of the stay 11 by screws 1a2.

Figure 2:
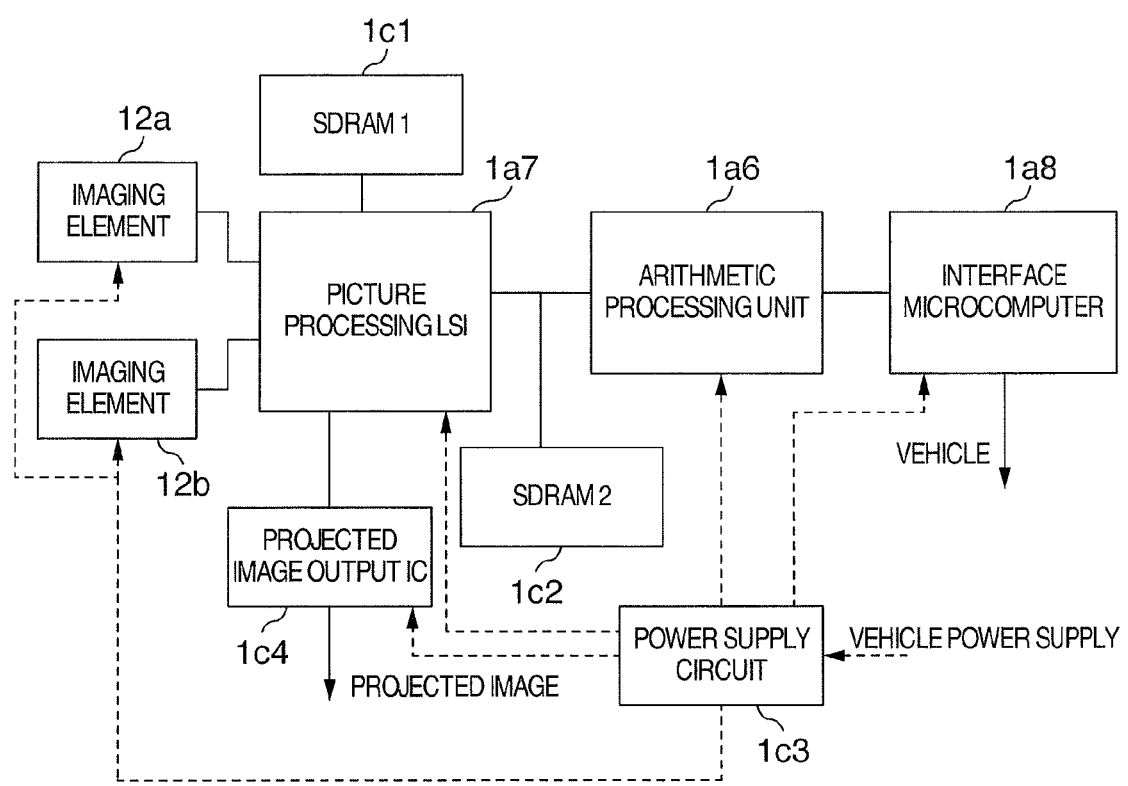
FIG. 2 is a system block diagram of a stereo camera in an embodiment of the invention.

FIG. 2 shows a system block diagram. Projected images taken by the left and right imaging elements 12a, 12b are transmitted to the processing substrate 1a9 through the harnesses 1b0 from the imaging element substrates 16a, 16b. In the processing substrate 1a9, projected image data are first fed to the picture processing LSI 1a7. The picture processing LSI 1a7 performs, as a pre-processing, in which stereo matching processing due to parallax is performed, shading processing, in which gain correction of the imaging elements 12a, 12b and correction of parallax in an imaging surface, generated from a marginal light quantity damping characteristic of the lenses 13a, 13b, on the projected image data to store the same in SDRAM1. Subsequently, stereo matching processing such as affine transformation, etc. is performed with the use of data of SDRAM1 to be stored in SDRAM2, which is a memory common to the arithmetic processing unit 1a6. The arithmetic processing unit 1a6 uses the stereo processed data stored in SDRAM2 to perform the processing of detecting various three-dimensional objects such as vehicle, pedestrian, etc., and final results of calculation are output outside through the interface microcomputer 1a8. Also, projected images are output outside through a projected image output IC from the projected image connector 1a5. Power supply to the stereo camera is performed by feeding power supply from a vehicle to a power supply circuit through the power supply connector 1a4 to convert the same into a necessary voltage to supply the same to respective microcomputers and respective ICs.

Figure 3:
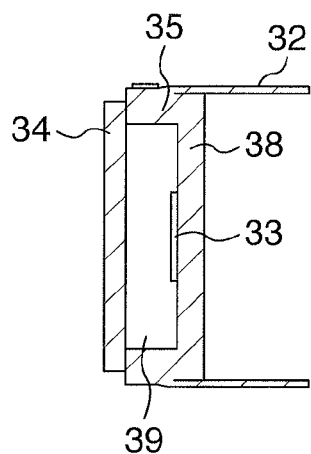
FIG. 3 is views showing mounting of an imaging element in an embodiment of the invention.
Figure 3:
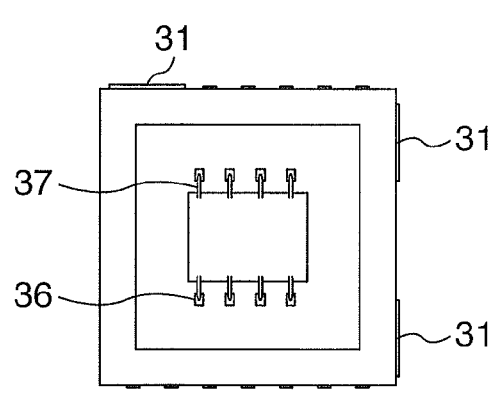
Figure 3:
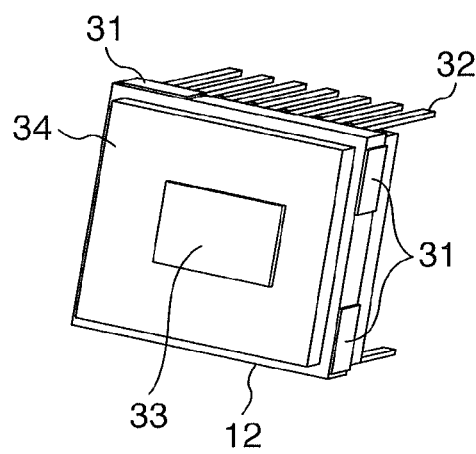
Figure 3:
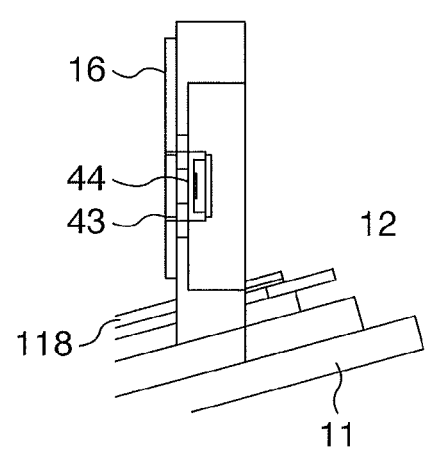

An embodiment of the structure of the stay projections 18a, 18b and mounting of the imaging elements 12a, 12b to the stay 11 will be described in detail with reference to FIGS. 3 to 5. In addition, while the embodiment will be described with respect to the case where CCD (for example, CCD having 380,000 pixels) is used as the imaging elements 12a, 12b, the same construction can be provided also in the case where other imaging elements such as CMOS, etc. are used.

FIG. 3(a) is a side view of the CCD, FIG. 3(b) is a front view, and FIG. 3(c) is a bird's-eye view. Thus, the CCD comprises a package 35, an imaging surface 33 mounted in a package recess 39, wires 37, through which a projected image received on the imaging surface 33 is assigned to respective terminals, metallic pads 36, to which the wires 37 are bonded, terminals 32 connected to the metallic pads 36, and a cover glass 34 for protection of the imaging surface. Projected image information formed on the imaging surface 33 by the lens 13 is transmitted to the imaging element substrate 16 through the wires 37, the pads 36, and the terminals 31.

Here, an optical axis of the lens 13 and the imaging surface 33 are required to be made to perpendicular to each other at the time of image formation. This is because in case of not being perpendicular to each other, a part of a projected image would get blurred to make the stereo matching processing impossible. Also, in performing the stereo matching processing, it is not preferred that disagreement except parallax is generated between a projected image acquired by the right imaging element and a projected image acquired by the left imaging element. Therefore, it becomes necessary to make the left and right imaging surfaces in relative agreement with each other in a height direction, direction of rotation, and focus.

Figure 4:
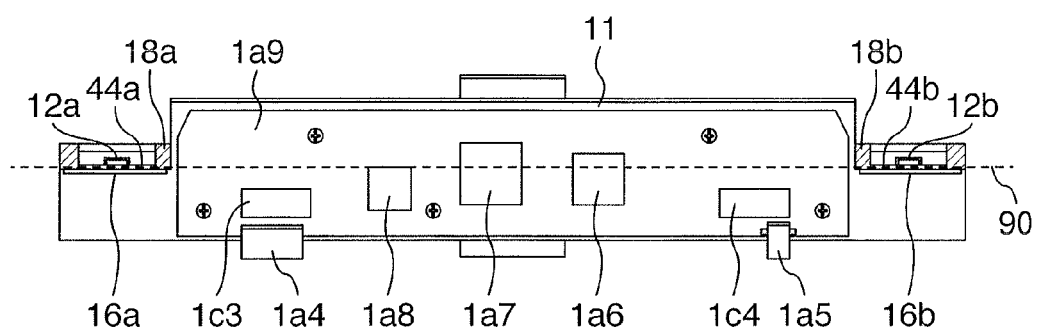
FIG. 4 is views showing mounting of an imaging element in an embodiment of the invention.
Figure 4:
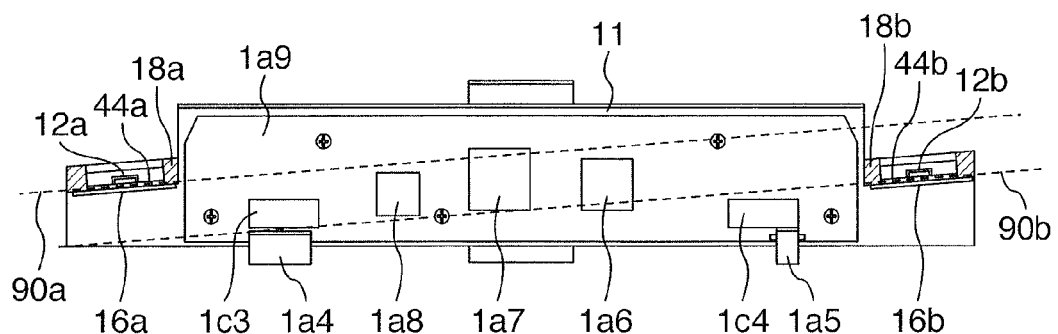
Figure 5:
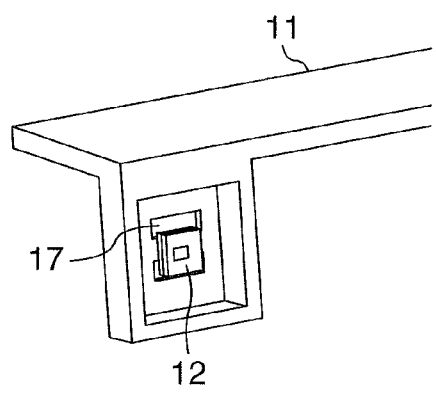
FIG. 5 is schematic views showing a structure of a stay projection in an embodiment of the invention.
Figure 5:
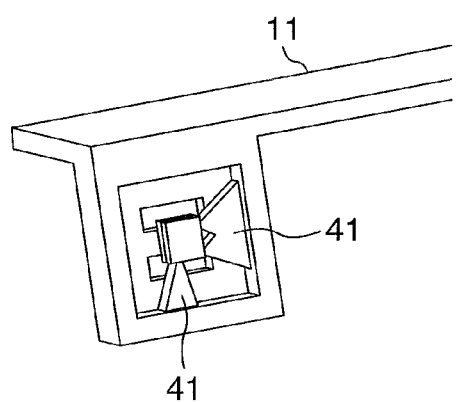
Figure 5:
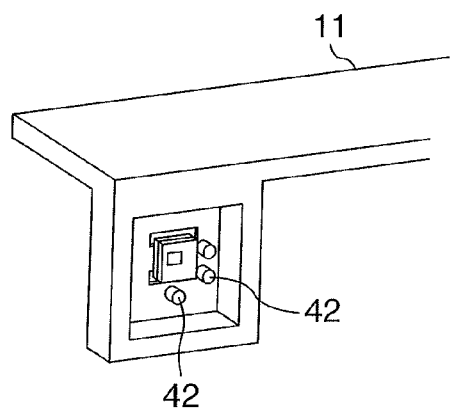

Hereupon, as shown in FIG. 4, the stay projections 18a, 18b of the stay 11 are provided with the imaging element mount surfaces 44a, 44b, of which reference surfaces are included in the same plane 90 (FIG. 4(a)), or in parallel planes 90a, 90b (FIG. 4(b)). Normally, the imaging surfaces 33 and package bottom surfaces 38 are manufactured so as to be maintained in parallelism within a certain requirement. Therefore, when the stay 11 is structured so that the left and right imaging element mount surfaces 44a, 44b are included in substantially the same plane 90 as shown in FIG. 4(a), the imaging surfaces 33 of the left and right imaging elements 12a, 12b mounted on the mount surfaces can be maintained favorable in parallelism, so that it is possible to get a projected image, which does not get locally blurred but is in focus. Accordingly, the stereo camera is improved in detection accuracy. Also, imaging in a direction deviated a little from a front direction of the camera is in some cases desirable in a state, in which the camera is mounted to a vehicle, depending on use of the stereo camera. For example, in the case where it is intended for detection of pedestrian, light vehicle, etc., which are on a foot walk or near to a side strip, imaging the left front in case of keeping to the left as a premise and imaging the right front in case of keeping to the right as a premise are in some cases desirable. In such case, the construction is made such that the imaging element mount surfaces 44a, 44b be included in substantially the parallel planes 90a, 90b as shown in FIG. 4(b).

Subsequently, that construction, in which rotational disagreement between the left and right imaging surfaces is eliminated, will be described. As shown in FIG. 3(c), reference surfaces 31 are provided in three locations on sides of the package 35 of the imaging element 12 and imaging element positioning surfaces 41 are also provided on the stay projection 18 to come into contact with the reference surfaces 31. The imaging element positioning surfaces 41 can be specifically shaped to be formed as a unitary structure as shown in FIG. 5(b), but imaging element positioning pins 42 may be provided on the stay projection 18 and heads of the pins 42 may be caused to serve as imaging element positioning surfaces 41 as shown in FIG. 5(c). In addition, the shape and the number of the imaging element positioning surfaces 41 depend upon the reference surfaces 31 provided on the imaging element 12 and the number may be, for example, four or more. FIG. 5(a) will be described later.

Since the stay 11 and the stay projections 18 comprise the same member, the structure described above is adopted to enable performing positioning while restricting disagreement of the imaging elements 12a, 12b relative to the stay reference surface 14 in a vertical direction, a left and right direction and a direction of rotation and to enable fixing the positional relationship between the left and right imaging elements at the same time.

Figure 6:
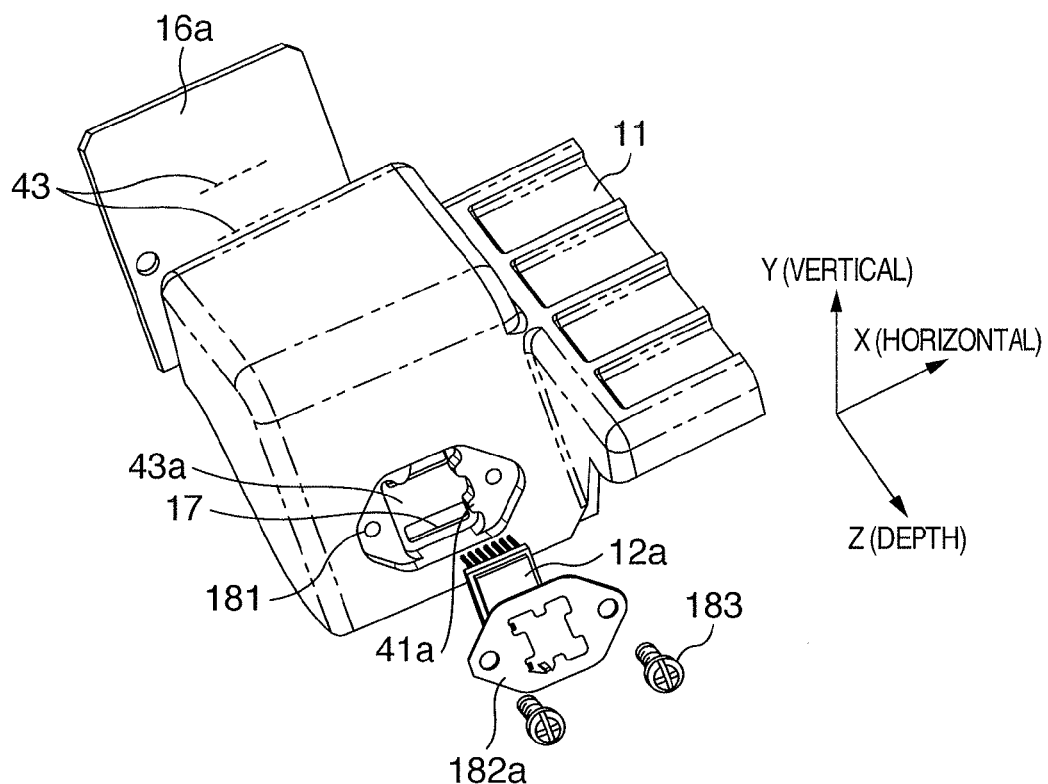
FIG. 6 is views showing an embodiment of a specific construction, by which an imaging element is fixed to a stay.
Figure 6:
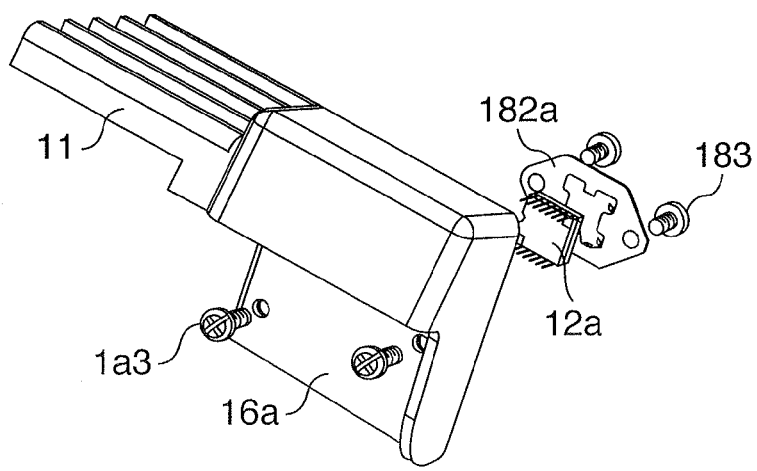
Figure 7:
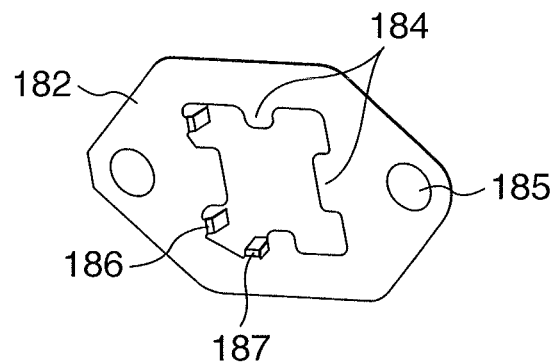
FIG. 7 is views showing an embodiment of a specific construction, by which an imaging element is fixed to a stay.
Figure 7:
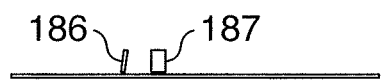
Figure 7:
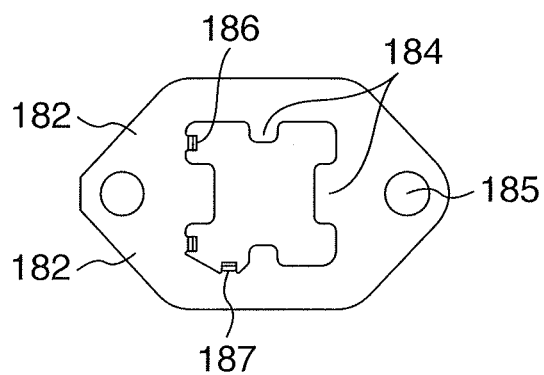
Figure 7:
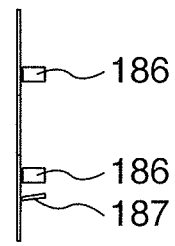

A detailed embodiment of that construction, in which the imaging elements 12 are fixed to the imaging element positioning surfaces 41 will be described with reference to FIGS. 6, 7, and 8. FIG. 6 is a view showing an outward appearance of the construction of fixation. As shown in FIG. 6(a), the imaging element mount surface 44a, on which an imaging element is mounted, is formed on the stay projection 18a provided at the end of the stay 11 and the imaging element positioning surfaces 41 are formed in those positions, which face the imaging element reference surfaces 31 when the imaging element 12a is mounted. In addition, while the following embodiment will be described showing only one 18a of the stay projections and one 12a of the imaging elements, the same construction applies also to the stay projection 18b and the imaging element 12b, which are provided at the other end of the stay 11. Subsequently, as shown in FIG. 6(b), the imaging element 12a is mounted on the imaging element mount surface 44a and an imaging element holding plate 182 is caused to cover the imaging element and clamped by lock screws 183. The imaging element holding plate 182 includes screw holes 185, through which the lock screws 183 pass, and the lock screws 183 pass through the screw holes 185 to be clamped to threaded holes 181.

Subsequently, details of that construction, in which the imaging element 12a is positioned, will be described with reference to FIGS. 7 and 8. FIGS. 7(a) to 7(d) are a bird's-eye view, a plan view, a front view, and a side view of the imaging element holding plate 182, and FIGS. 8(a) to 8(c) are a plan view, a front view, and a side view showing a state, in which the imaging element holding plate 182 is mounted to the stay projection 18.

The imaging element holding plate 182 includes pawls 184, 186, 187 as shown in FIGS. 7(a) to 7(d).

Figure 8:
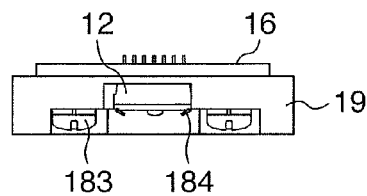
FIG. 8 is views showing an embodiment of a specific construction, by which an imaging element is fixed to a stay.
Figure 8:
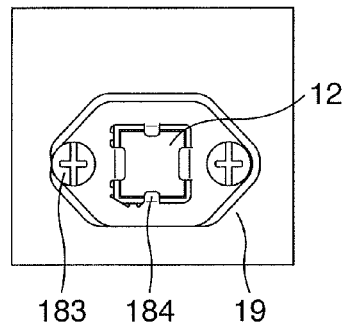
Figure 8:
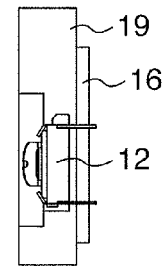

In a state, in which the imaging element holding plate 182 is fixed to the stay projection 18, the pawl 184 is pushed against the imaging element 12a to be deformed as shown in FIG. 8 to generate a biasing force, with which the imaging element 12a is pushed against the imaging element mount surface 44. While the pawl 184 may be structured prior to being mounted to define the same plane as that of the imaging element holding plate 182 as shown in FIG. 7(a), it may be structured to be beforehand bent.

In a state, in which the imaging element holding plate 182 is fixed to the stay projection 18a, the pawls 186, 187 are pushed and bent by the imaging element 12a to be deformed as shown in FIG. 8 to generate biasing forces, with which the imaging element 12a is pushed against the imaging element positioning surfaces 41. In the present embodiment, the pawls 186, 187 are provided inclining to a side in contact with the imaging element 12a rather than in a direction perpendicular to the imaging element holding plate 182 as shown in FIG. 8. Thereby, in a state, in which the imaging element holding plate 182 is fixed to the stay projection 18a, the pawls 186, 187 are made substantially perpendicular to the imaging element holding plate 182 as shown in FIG. 7 to enable coming into surface contact with sides of the imaging element 12a to hold the same.

With the construction, the imaging surface of the imaging element 12a is held down by the pawls 186 in a horizontal direction (X-axis direction), by the pawl 187 in a vertical direction (Y-axis direction), and by the pawl 184 in a depth direction (Z-axis direction). Thereby, the imaging element 12a is securely pushed against the imaging element mount surface 44a and the imaging element positioning surfaces 41a to create a projected image, which does not get locally blurred and is free of left and right disagreement of optical axis and rotational disagreement. In particular, in order to prevent rotational disagreement, it is preferred that three or more of the imaging element positioning surfaces 41a be provided on each of the respective imaging elements. In addition, since the imaging element positioning surfaces 41a in the embodiment are provided two on a horizontal plane and one on a vertical plane, the pawls 186 are provided two in the horizontal direction and the pawl 187 is provided one in the vertical direction. However, the imaging element positioning surface 41a may be provided one on a horizontal plane and two on a vertical plane, and the pawls 186 may be provided one in the horizontal direction and the pawls 187 may be provided two in the vertical direction. In addition, the imaging element positioning surfaces 41 in the embodiment are positioned on an upper side and holding-down from under is effected by the pawls of the imaging element holding plate 182 in a state, in which the stereo camera is mounted to a vehicle, but that construction is enabled, in which the imaging element positioning surfaces 41 are positioned on a lower side and holding-down from above is effected by the pawls in a state, in which the stereo camera is mounted to a vehicle. With this construction, since the gravitational force also acts in a direction, in which the imaging element 12 is pushed against the imaging element positioning surfaces 41a, it is possible to improve the resistance against vibrations, etc.

After the imaging element 12a is pushed against the imaging element mount surface 44a and the imaging element positioning surfaces 41a by means of the imaging element holding plate 182 to be screwed and fixed, the imaging element substrate 16 is fixed by means of the screws 1a3. Here, the imaging element terminals 32 are made larger in length than a thickness of the imaging element mount surface 44 of the stay projection 18a. Thereby, the imaging element terminals 32 pass through the holes 43 provided on the stay projection 18a to reach the holes 43 of the imaging element substrate 16a. Finally, the imaging element terminals 32 and the imaging element substrate 16a are soldered together to complete electric connection.

That is, after the imaging element 12a is mounted directly on the stay projection 18a, which is the same member as the stay 11, as shown in FIG. 3(d), the imaging element substrate 16a, on which a circuit for driving of an imaging element is mounted, is fixed to the stay projection 18a from behind.

Figure 9:
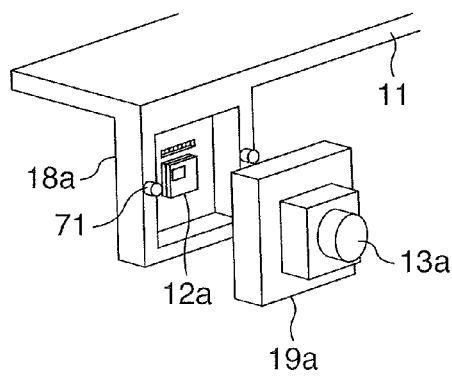
FIG. 9 is schematic views of a construction, by which a lens holder is mounted to a stay, in an embodiment of the invention.
Figure 9:
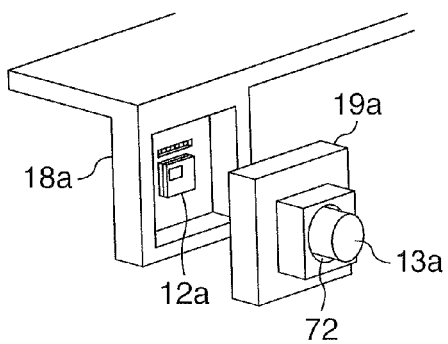

Subsequently, the lenses are regulated in position and fixed with each of the lens holders 19a, 19b so that centers of the imaging surfaces 33a, 33b of the left and right imaging elements 12a, 12b agree with centers of the lenses 13a, 13b. At this time, lens holder positioning pins 71 may be beforehand provided on the stay projections 18a, 18b or the lens holders 19a, 19b as shown in FIG. 9(a) and the lens holders 19a, 19b may be mounted and fixed in registration with the pins. Alternatively, the lens holders 19a, 19b may be beforehand fixed to the stay projections and the lenses 13a, 13b themselves may be regulated in agreement with centers of the imaging elements 12a, 12b as shown in FIG. 9(b), after which the lenses 13a, 13b may be fixed to the lens holders 19a, 19b by means of an adhesive, or the like. In this case, a recess 72 for mounting of the lens 13 on the lens holder 19 is larger in diameter than the lens 13, and the lens 13 and the imaging element 12 are regulated in positional relationship and then fixed together by means of an adhesive.

Figure 10:
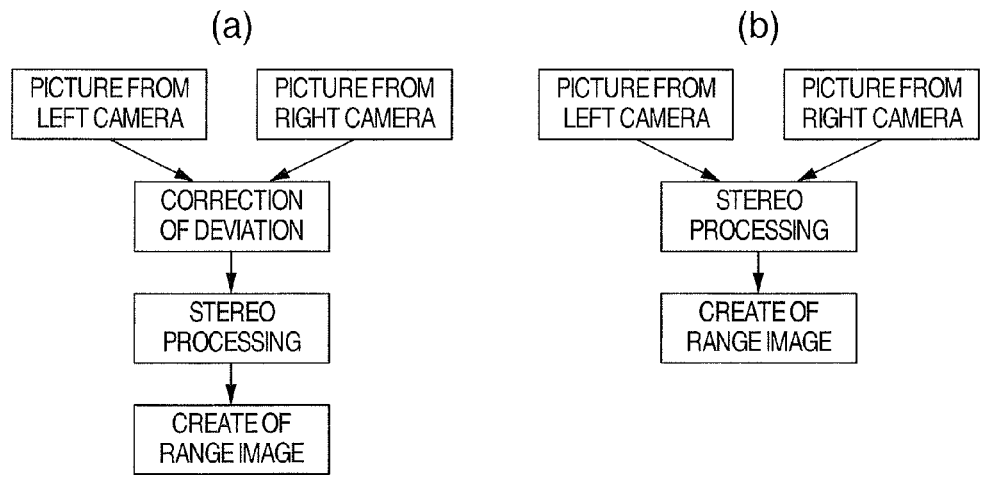
FIG. 10 is a flowchart up to calculation of a distance to an object in a conventional constitution and a flowchart when a distance to an object is calculated in a constitution of the invention.
Figure 18:
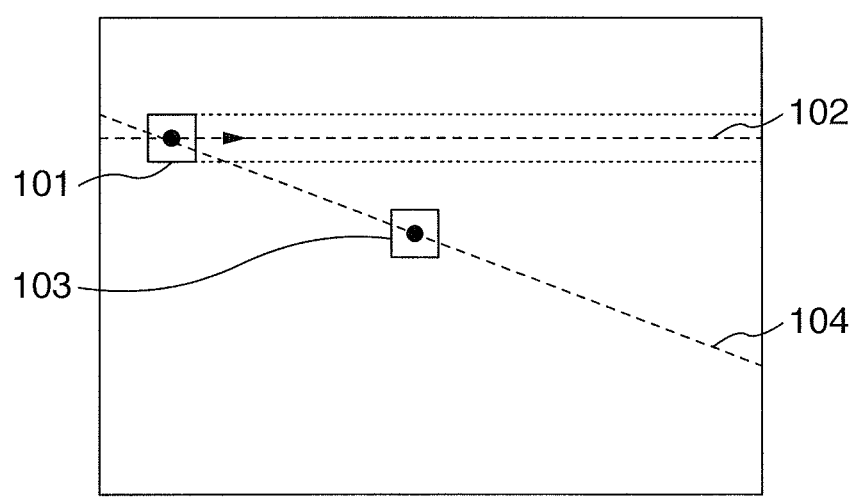
FIG. 18 is a schematic view illustrating an improvement of a picture processing LSI in processing speed when mounting of an imaging element according to the invention is performed.

In this manner, the positional relationship between the two imaging elements 12a, 12b is determined, the positional relationship between the respective imaging elements 12a, 12b and the lenses 13a, 13b is determined, and optical axes are fixed in proper directions. With this construction, the positional relationship between the imaging elements can be determined simply with high accuracy by mounting the imaging elements directly on the stay. Thereby, while it is usual that projected images taken from left and right imaging elements are subjected to correction of disagreement and then stereo processing to create a range image up to an object as shown in FIG. 10(a), the positional relationship between the left and right imaging elements is established with high accuracy whereby it becomes possible as shown in FIG. 10(b) to subject left and right projected images to stereo processing intact to create a range image without performing correction of disagreement. For example, in the case where rotational disagreement is generated between imaging elements as mounted, it is required that a point corresponding to a certain featuring point on a picture obtained by one of imaging means be searched as shown in FIG. 18 on a picture obtained by the other of imaging means in a search direction 104 in the case where rotational disagreement is involved in the imaging elements. In this case, for example, where a picture size is 512 pixels×200 pixels, pixel disagreement in search directions 102, 104 is ±30 pixels, 32bitSDRAM has a burst lead size of 8 pixel burst, and a burst lead cycle is 8 cycles, the data lead cycle of SDRAM amounts to 8 cycles×512 pixels/8 pixels×200 lines×2=204800 cycles and the data lead cycle of 12800 for correction of rotational disagreement is added thereto to need 217600 cycles. In contrast, in the case where no rotational disagreement is generated, the burst lead cycle of SDRAM amounts to 134 cycles×200 lines=26800 cycles and so 217600/26800 results, that is, high speed by about 8 times can be expected as compared with the case where no rotational disagreement is generated. In this manner, a sharp improvement in processing speed is achieved only by cancellation of rotational disagreement between imaging elements.

In this manner, according to the embodiment, the positional relationship between imaging elements themselves is correctly regulated in vertical, left and right, and rotational directions and the imaging elements are mounted directly to one member (stay). Thereby, as compared with the prior art, there is no need of performing the work of reducing tolerances involved in the positional relationship between imaging elements and correcting disagreement in the positional relationship between imaging elements after two camera parts are mounted to a stay, which work has been performed conventionally. Thereby, it is possible to achieve shortage in turnaround time and to improve the accuracy in distance calculation by the stereo processing.

Figure 11:
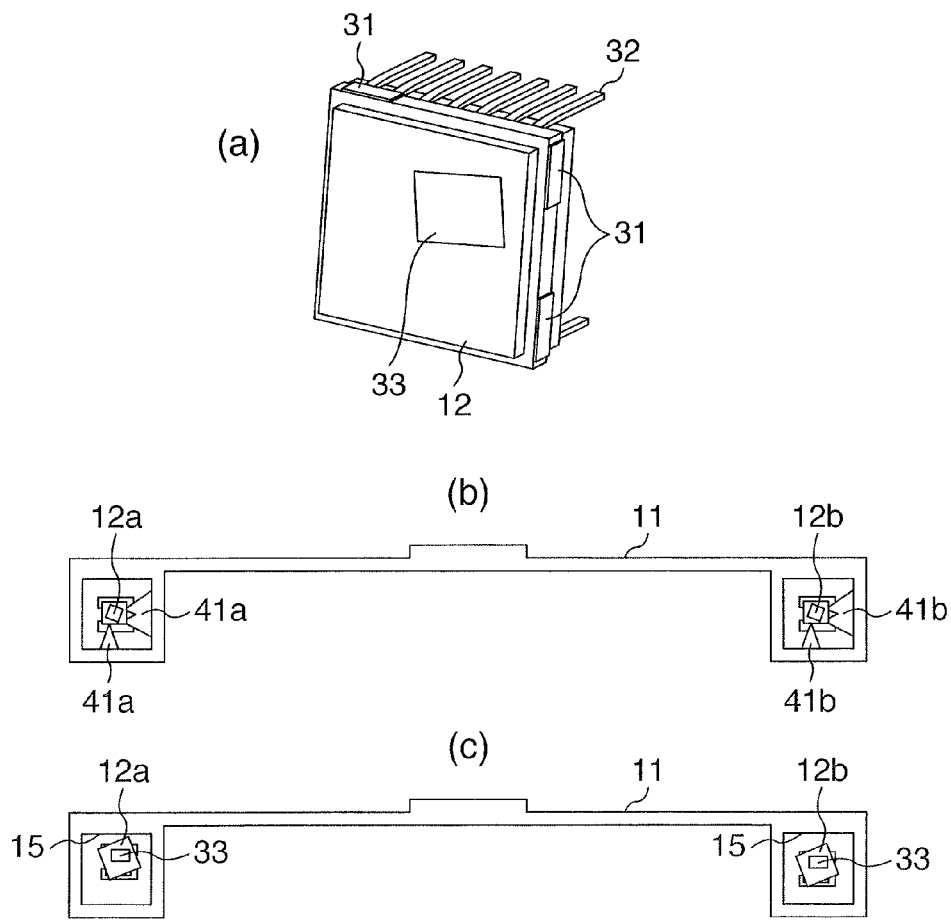
FIG. 11 is schematic views showing structures of stay projections when respective imaging elements are mounted in first and second embodiments of the invention.

A second embodiment, in which an imaging element 12 is mounted to a stay 11 with higher accuracy than that in the first embodiment, will be described with reference to FIG. 11. As shown in FIG. 11(a), an imaging surface 33 of the imaging element actually involves some disagreement in a rotational direction, and a package 35 of the imaging element and the imaging surface are not put in a correctly parallel, positional relationship but disagreement in left and right, vertical, and rotational directions is generated in a narrow sense. Such disagreement in mounting of the imaging surface 33 is defined as tolerance relative to a reference surface 31 of the package. For example, tolerance in a rotational direction is defined as being ±1 degree for CCD of, for example, 380,000 pixels. Accordingly, disagreement in rotating angle generated between two imaging elements becomes 2 degrees at maximum. Likewise, since tolerance in the vertical or the left and right direction amounts to ±200 μm, disagreement in the vertical or the left and right direction, generated between two imaging elements becomes 400 μm at maximum.

Therefore, in the case where imaging elements are mounted with the construction of the first embodiment, disagreement in left and right, vertical, and rotational directions is generated between the respective imaging surfaces 33a, 33b even when packages of the imaging elements 12a, 12b are exactly positioned relative to the stay 11 as shown in FIG. 11(b).

Figure 12:
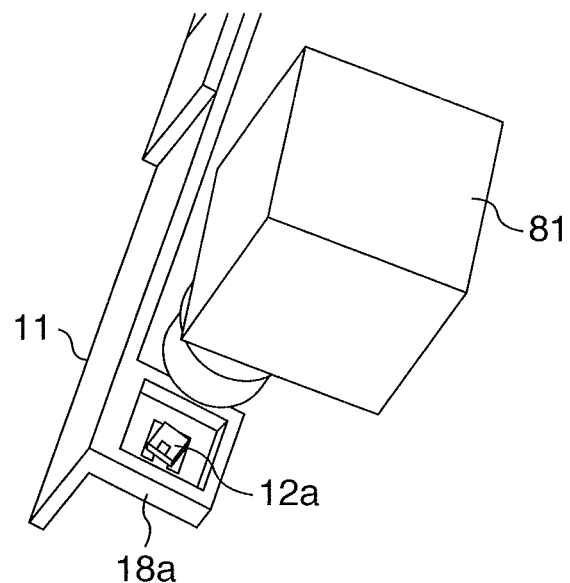
FIG. 12 is schematic views showing a method of positioning an imaging element in an embodiment of the invention.
Figure 12:
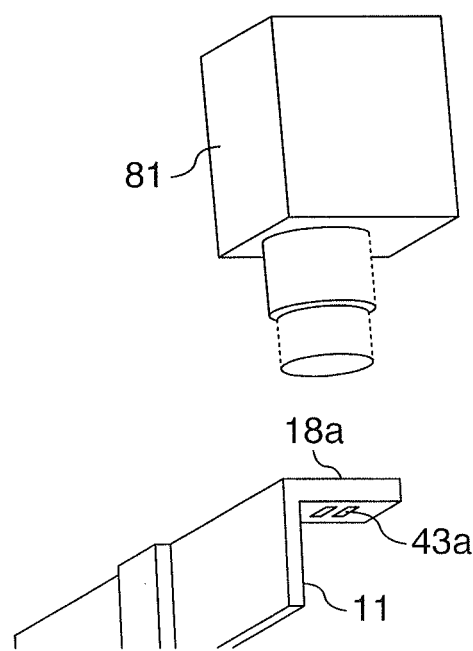

A constitution shown in FIG. 11(c) is conceivable as a construction for correction of such disagreement. As shown in, for example, FIGS. 12(a) and 12(b), a television camera 81 is prepared to photograph the imaging surface 33 itself of the imaging element 12. The television camera 81 photographs an external shape of the imaging surface 33 of the imaging element 12 and a stay projection reference surface 15 at a time and regulation is effected so that the imaging surface 33 of the imaging element and the stay projection reference surface 15 are made in parallel to each other, or aligned at a constant angle. The stay projection reference surface 15 is a mark, which can be recognized by the television camera 81 present in the vicinity of the imaging element mount surface 44, and which uses a step, a line, etc. being easy to extract as an edge in picture data. In this embodiment, a step about the imaging element mount surface 44 provided on the stay projection 18 is made the stay projection reference surface 15. Regulation is effected by mounting a robot arm, which moves position of the imaging element 12 or a micrometer for regulation with manual operation by a human. That surface, which makes a reference in regulating the position of the imaging surface 33, may be made the stay reference surface 14.

By observing the position of the imaging surface 33 for mutual regulation in this manner, it becomes possible to mount the imaging elements 12a, 12b so that as shown in FIG. 11(b) the positional relationship therebetween is further highly accurate than that constitution, in which mounting is effected on the basis of the reference surfaces 31 provided on the packages of the imaging elements 12 (FIG. 11(b)).

In addition, while the imaging element positioning surfaces 41 in three or more locations may be provided as shown in FIGS. 5(b) and 5(c) in the present embodiment, positioning only in the depth direction (Z direction) may be effected by the use of the imaging element mount surface 44 and regulation in the X and Y directions may be effected by the use of the robot arm or micrometer described above as shown in FIG. 5(a) instead of providing the imaging element positioning surfaces 41 in the horizontal direction (X direction) and in the vertical direction (Y direction). In this case, an adhesive is used for fixation of the imaging element 12 and the stay projection 18.

Further, that construction will do, in which the imaging element positioning surfaces 41 are provided in two locations and rough, positional regulation is effected through pushing against the imaging element positioning surfaces 41 in two locations and fine regulation is effected by the use of a camera and a robot arm, or a micrometer. In this manner, that constitution, in which rough, positional regulation is effected with the imaging element positioning surfaces 41 and fine regulation is effected by the use of a robot arm, is suited to automated manufacturing with machine tools.

It has been described in the first and second embodiments that the two imaging elements 12a, 12b are positioned on one stay 11 and thereafter the lenses 13a, 13b are mounted on the respective imaging elements 12a, 12b so that respective optical axes thereof are made parallel to each other. Here, the optical axes mean virtual straight lines created by the positional relationship between the lenses 13 fixed to the lens holders 19 and the imaging elements 12 fixed to the stay 11. In order to perform stereo viewing with accuracy, it is desired that the positional relationship between the lenses 13a, 13b positioned and fixed in the manner described above and the imaging elements 12a, 12b be invariable.

On the other hand, the use of a lens hood in a car-mounted camera is effective in photographing the situation outside a vehicle and eliminating saturation of the imaging elements 12 caused by direct incidence of sunshine and incidence of intense light in an unnecessary direction.

Figure 14:
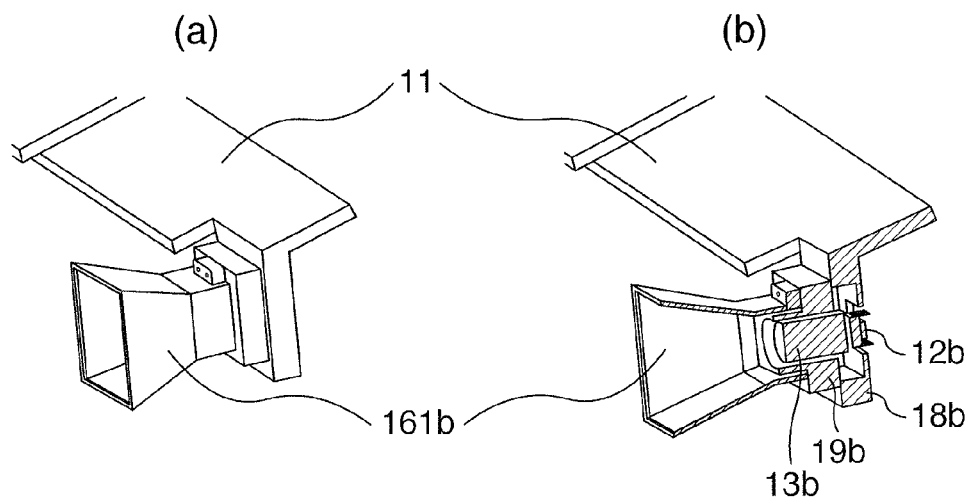
FIG. 14 is views showing a structure of a lens hood in the prior art.

In the case where a lens hood 161 is mounted with the lens holder 19 as a base thereof as shown in FIG. 14, however, there is possibility that since the lens hood 161 projects, a shock is applied to the lens hood 161 at the time of conveyance of a camera and at the time of mounting on a vehicle and so the positional relationship between the lenses 13a, 13b and the imaging elements 12a, 12b is varied.

Figure 13:
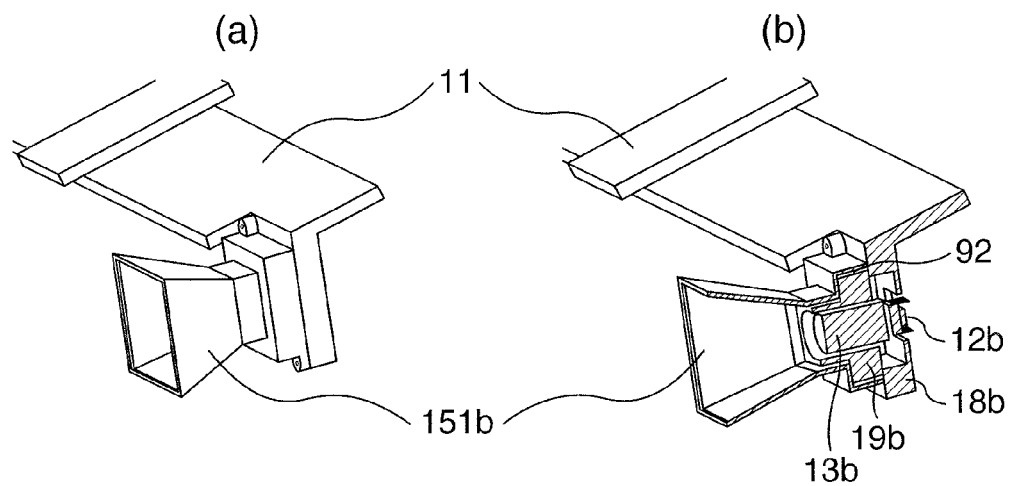
FIG. 13 is views showing a structure of a lens hood in an embodiment of the invention.

Hereupon, the embodiment presents that constitution, in which the positional relationship between the lenses 13a, 13b and the imaging elements 12a, 12b is not varied even when the lens hood 161 receives impact. In addition, while the following embodiment will be described with the use of one 12b of the imaging elements and one 13b of the lenses, the same may be said of the imaging element 12a and the lens 13a on the other side. In a construction shown in FIG. 13, a lens hood 151b is made bag-shaped so as to envelop a lens holder 19b whereby the lens hood 151b is not fixed to the lens holder 19b but fixed directly to a stay 11. FIG. 13(a) is a view of an outward appearance of the lens hood and FIG. 13(b) is a cross sectional view. In addition, a bag-shaped portion of the lens hood 151b includes a clearance (gap) 92 so as not to come into contact with the lens holder 19b and is structured so that even when some impact is applied to the lens hood 151b, the lens holder 19b is prevented from being deviated in position under such influence. Thereby, even when the position of the lens hood 151b relative to the stay 11 is somewhat varied by impact, the lens holder 19b is not varied in position, so that that highly accurate, positional relationship between the lens 13b and the imaging element 12b, which is essential in stereo processing, is maintained normal. In addition, a lens hood 151a on the other side is structured likewise and the same effect is produced.

Also, since disturbance light incident from the clearance of the lens holder can be surely shut out as compared with the prior art, it is possible to take in a further sharp image.

Figure 15:
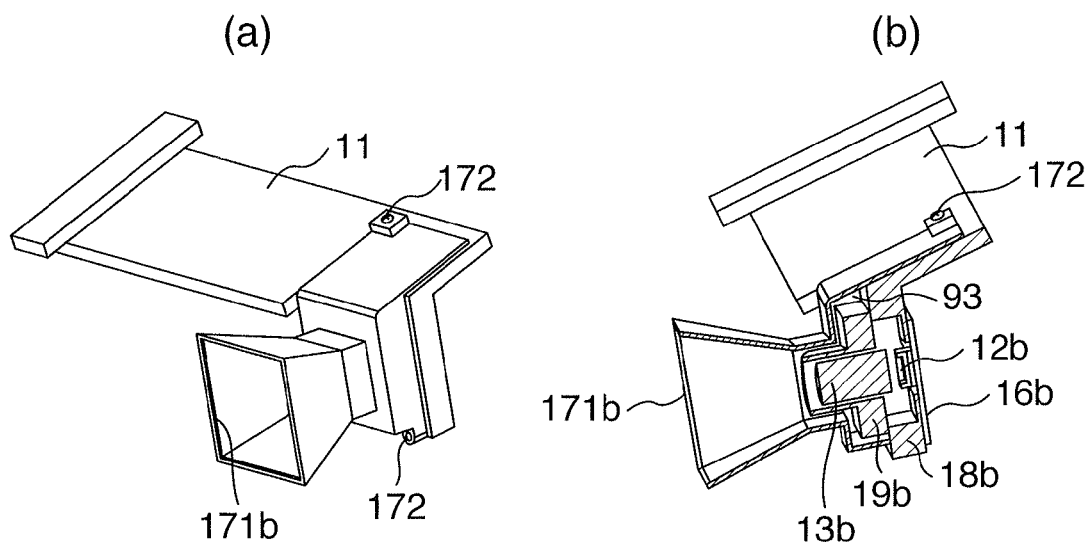
FIG. 15 is views showing a structure of a lens hood in a further embodiment of the invention.

Also, a lens hood 171b structured with a cover region further enlarged as shown in FIG. 15 may be used. The lens hood is fixed to a stay part by means of a screw 172. FIG. 15(a) is a view showing an outward appearance and FIG. 15(b) is a cross sectional view. With such structure, in which an entire lens holder is enveloped from an upper surface of the stay 11, a screw hole for fixation of the lens hood 171b is made unnecessary on a stay projection 18b, so that freedom is improved in designing a size and a shape of the stay projection 18b, a mount structure of the lens holder 19b, etc. Also, since a clearance (gap) 93 between the lens holder 19b and the lens hood 171b can be ensured to be made wider than that in the embodiment shown in FIG. 13, that construction is provided, in which it is further possible to prevent the positional relationship from being varied by impact. Also, since light can be shut out such that the lens and the imaging element are enveloped from rearward (a side of the imaging element) of a mount surface of the lens holder 19b and the stay projection 18b, it is possible to further surely shut out the disturbance light. In addition, a lens hood 171a on the opposite side is structured likewise and the same effect is produced.

INDUSTRIAL APPLICABILITY

According to the invention, a stereo camera can be improved in productivity since one of joint locations with tolerance can be reduced as compared with the prior art, in which two cameras are assembled separately and then mounted to a stay. Also, since the processing of correction of positional disagreement and angular disagreement between imaging elements can be omitted to some extent, a stereo camera can be improved in processing speed and measurement accuracy with a simple constitution.

The invention claimed is:
1. A stereo camera comprising:
a first imaging element;
a second imaging element;
a stay;

a first mount surface which is integrally provided with the stay and on which the first imaging element is mounted;
a second mount surface which is integrally provided with the stay and on which the second imaging element is mounted;
a first holding plate, which pushes the first imaging element against the first mount surface; and
a second holding plate, which pushes the second imaging element against the second mount surface;
wherein each of the first and second imaging elements has reference surfaces on adjacent sides for positioning, the stay has positioning surfaces at positions opposed to the reference surfaces, and the first mount surface and the second mount surface are included in substantially the same plane or in substantially parallel planes;
wherein the first and second holding plates are respectively clamped against the first and second mount surfaces integrally provided with the stay and have multiple pawls that push the first and second imaging elements against the positioning surfaces of the stay by contacting adjacent intersecting sides of the first and second imaging elements; and
wherein the first and second holding plates have additional pawls that push the imaging elements against the mount surfaces integrally provided with the stay.

2. The stereo camera according to claim 1, wherein at least three of the reference surfaces are provided on each of the imaging elements.

3. The stereo camera according to claim 1, wherein the first and second imaging elements are fixed to the mount surfaces by an adhesive.

4. The stereo camera according to claim 1, further comprising:
a first lens, which constitutes an imaging system in combination with the first imaging element;
a first lens holder fixed to the stay to hold the first lens;
a second lens, which constitutes another imaging system in combination with the second imaging element;
a second lens holder fixed to the stay to hold the second lens;
a first lens hood fixed to the stay to cover the first lens holder; and
a second lens hood fixed to the stay to cover the second lens holder;
wherein gaps are provided between the first and second lens hoods and the first and second lens holders.

5. The stereo camera according to claim 1, wherein the stay comprises a mark or structure, which serves as a reference for positioning the imaging elements, in the vicinity of the first mount surface and in the vicinity of the second mount surface, and which can be recognized by a video camera.

6. The stereo camera according to claim 1, wherein the stay and the first and second mount surfaces enable positioning of the first and second imaging elements relative to the stay in a direction of rotation.

* * * * *